June 19, 1962

P. J. GOLLHOFER 3,039,350

MAGNIFYING DEVICE

Filed Feb. 2, 1960

Paul J. Gollhofer
INVENTOR.

BY *Clarence A. O'Brien*
and *Harvey B. Jacobson*
Attorneys

United States Patent Office 3,039,350
Patented June 19, 1962

3,039,350
MAGNIFYING DEVICE
Paul J. Gollhofer, 9 Haab Ave., Babylon, N.Y.
Filed Feb. 2, 1960, Ser. No. 6,311
2 Claims. (Cl. 88—1)

This invention relates to magnifiers and more particularly to an optical magnifier.

An object of the invention is to provide a magnifier for script or printed material, which is helpful to people who have poor vision and need magnification of the printed matter.

One of the advantages of the magnifier is that it facilitates reading on a single line and is helpful to children to eliminate cross line reading. The magnifier may be used in any other capacity, for instance as an aid to a lecturer, radio or television announcer when reading script.

Briefly, the magnifier is embodied in a light box which has a reading surface equipped with a slot. A lens extends across the reading surface and is in alignment with the slot. A printed matter feed of very simple construction may be used to move the printed matter between the lens and the slot so that light shining from the box passes through the slot, the printed matter and the lens thereby presenting an enlarged image of the reading matter to the viewer.

An important feature of the invention is found in its simplicity of construction and its ease of use. It may be used by school children and adults, but the important thing is that it is so simple to operate and use that it is well within the abilities of a school child to use the same.

Although the magnifier, when used by the school child, has a principal application in connection with children having poor eyesight, the device may well be used for beginners in reading so that they will not have the usual difficulty of cross-line reading. Even though use by a child is suggested herein, adults either with perfect vision or with poor vision will find the magnifying device of great help in reading small print on conventional paper.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
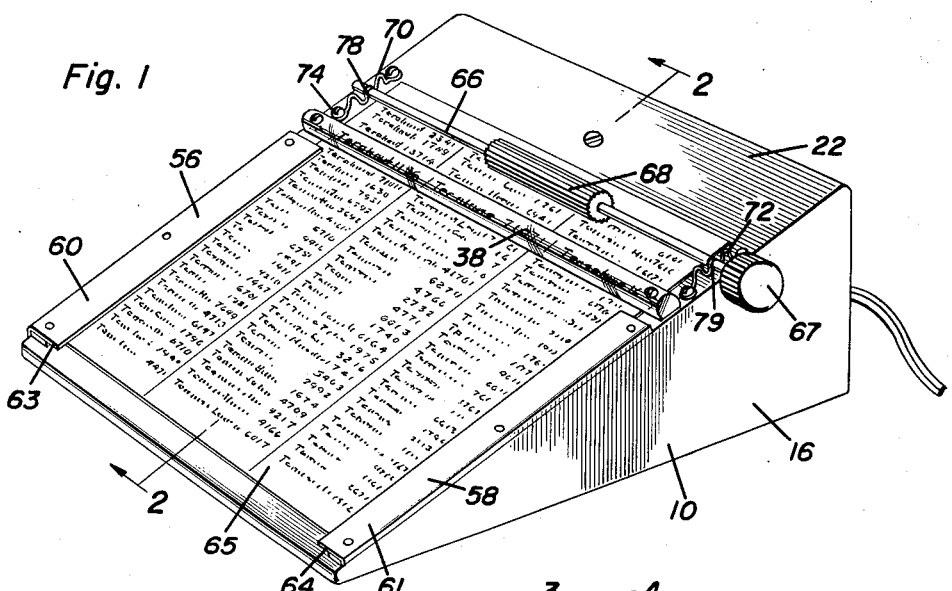
FIGURE 1 is a perspective view of a magnifying device constructed in accordance with the invention.

In the accompanying drawing there is an illustration of a magnifying device 10 which exemplifies the invention. The magnifying device 10 is constructed of a light box 12 having a bottom 14 constructed either open or closed, preferably the former, a pair of triangular side walls 16 and 18 and a rear wall 20 of rectangular shape. An inclined surface is formed by a wall 22 which extends from the upper edge of wall 20 to the front edge of bottom 14. The light box 12 is made of opaque material, for example, lightweight metal, wood, composition board or other suitable material. The cavity 24 enclosed by the light box contains an electric light bulb 26 mounted in a conventional socket 28 that is supported by a mounting bracket 30. The mounting bracket may be secured to any of the walls of the light box, for instance wall 22, and one of the walls has an aperture 32 through which line cord 34 may extend to a source of electrical potential.

Should it be desirable, a switch may be interposed in line 34 and mounted conveniently on a part of the light box.

Wall 22 has a transverse slot 36 therein, and the slot forms a light passage for the rays of light emanating from light bulb 26. A lens 38, for example, an approximately cylindrical lens made of plastic or glass, extends across slot 36 and is resiliently supported by means of resilient mounting assemblies 40 and 42 which are each identical. Typical assembly 42 consists of a bolt 44 extending through an aperture in lens 38 near one end thereof and through an aperture 46 in wall 22 at one end of slot 36. A spring 48 reacts on an upper washer 50 seated on the bottom surface of wall 22 and reacts on a nut 52 connected to bolt 44. This allows the compression of spring 48 to be adjusted and thereby regulates the force at which lens 38 is resiliently pressed toward the surface of wall 22 above slot 36.

Wall 22 has two paper guides 56 and 58 near the side edges thereof. Each guide is in the form of a channel, and the two channels open inwardly toward each other. The upper members 60 and 61 of the two channels are slightly longer than the lower members so that they overlie a portion of the surface of wall 22 and cooperate with those portions to form guideways 63 and 64 for a sheet 65 of reading material.

The feed for the sheet 65 is very simple in construction. It consists of a shaft 66 having a knob 67 at one end thereof. The shaft extends transversely across wall 22 and is located above the lens 38 (FIGURE 1). Feed wheel 68 is in the form of a serrated rubber cylinder fixed to or frictionally held secure on shaft 66 between the ends thereof. The bearings for the shaft 66 consists of a pair of undulated spring wires 70 and 72 with eyes at the ends thereof through which fasteners, for instance bolts 74 extend. These bolts also extend through holes in the wall 22. The undulated springs 70 and 72 have downwardly opening pockets 78 and 79 formed therein, and portions of shaft 66 seat in these pockets. The inherent resilience of the springs 70 and 72 press the shaft 64 downwardly with sufficient force to engage the feed wheel 68 with the top surface of sheet 65.

In use, a sheet 65 of conventional printed or written material and on conventional paper which is light transmissive is placed within the guides 56 and 58, and the upper edge of the sheet 65 is engaged on the feed wheel 68. When the electric light bulb is illuminated, the light box becomes filled with light and some of the light rays pass through slot 36 and through the sheet 65 covering the slot. The light rays also pass through the lens 38, furnishing illumination of the line of written material over slot 36, while the lens 38 magnifies the line of written material. When the knob 67 is turned, the sheet 65 is fed, but the motion of the sheet is constrained by guides 56 and 58 and also by the lens 38 which overlies the sheet in a transverse direction with respect to the sheet 65.

Figure 2:
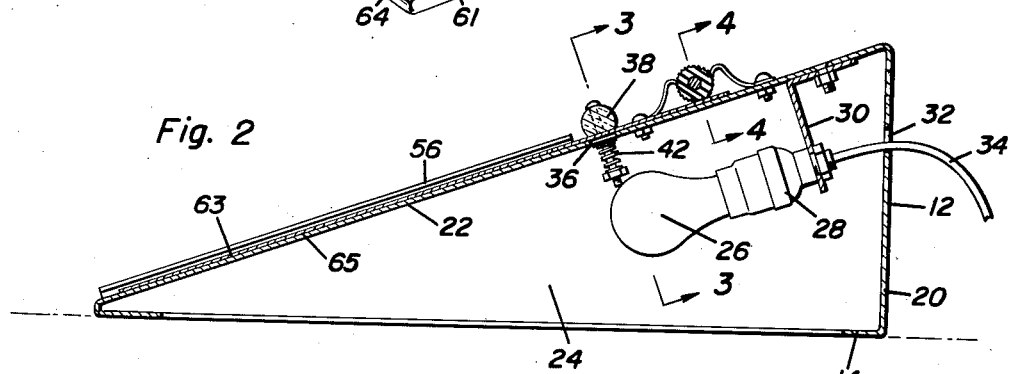
FIGURE 2 is a sectional view taken on the line 2—2 of FIGURE 1.
Figure 3:
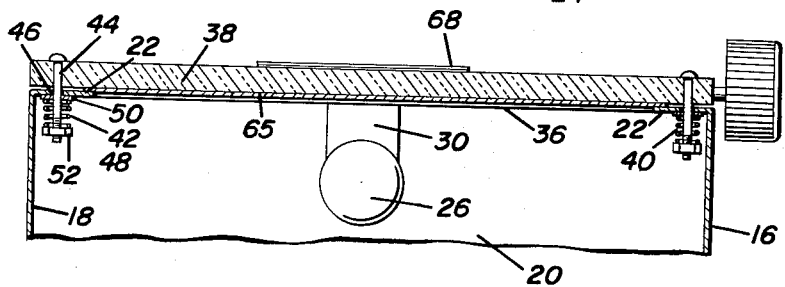
FIGURE 3 is a sectional view taken on the line 3—3 of FIGURE 2.
Figure 4:
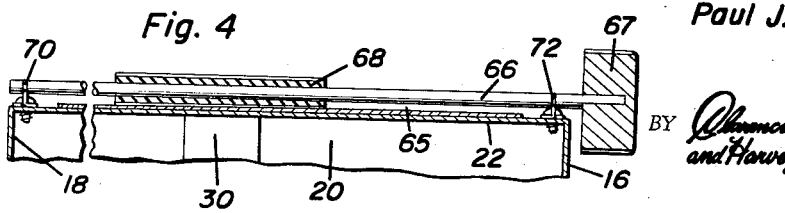
FIGURE 4 is a sectional view taken approximately on the line 4—4 of FIGURE 2.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed. For example, the inclined surface formed by wall 22 is the surface which supports the reading material. The wall 22 may be made of opaque plastic or plastic made opaque by masking. The masking would be conventional i.e. by painting or covering with an opaque sheet. In such an arrangement, the light slot 36 would not be a mechanical slot but would be merely a light transmissive slot to be formed by an elongate opening in the masking material. Obviously, if opaque plastic is used without the masking technique, the slot 36 would not only be a mechanical slot but also a light transmissive slot. Slot 36 in wall 22 (FIGURE 2) is a mechanical slot, however, the principal function is for light transmission and therefore the term "slot" as used herein is intended to mean a light transmissive slot and does not necessarily mean or require a mechanical slot to achieve this function.

What is claimed as new is as follows:

1. A reading matter magnifying device comprising a box having an opening therein, means for mounting a sheet of reading matter on the box over the opening, a lamp in the box for illuminating the reading matter on the sheet through the opening, a lens on the box over the opening for magnifying the illuminated reading matter, bolts on the end portions of the lens extending slidably through the top into the box, coil springs in the box operatively connected to said bolts for yieldingly engaging the lens with the sheet for frictionally resisting movement of said sheet across the opening, nuts threaded on the bolts for adjusting the tension of the coil springs, a pair of undulated springs mounted on the box and having their end portions secured thereto, a shaft journaled in certain of the undulations of the last-named springs yieldingly urged by said last-named springs toward the box, and a roller on said shaft frictionally engageable with the sheet for feeding same across the opening against the frictional resistance of the lens which otherwise prevents sliding movement of the sheet.

2. A reading matter magnifying device in accordance with claim 1, wherein said sheet mounting means comprises a pair of spaced, parallel, opposed channel guides on the side portions of the top for slidably receiving the marginal side portions of the sheet.

References Cited in the file of this patent

UNITED STATES PATENTS

| | | |
|---|---|---|
| 1,457,429 | Fiske | June 5, 1923 |
| 2,239,032 | Boch | Apr. 22, 1941 |
| 2,331,149 | Van Buren | Oct. 5, 1943 |
| 2,527,071 | Pierce | Oct. 24, 1950 |
| 2,541,161 | Harper | Feb. 13, 1951 |
| 2,737,741 | Rice | Mar. 13, 1956 |
| 2,747,465 | Carden | May 29, 1956 |